US012697934B2

(12) United States Patent
Ohno et al.

(10) Patent No.: US 12,697,934 B2
(45) Date of Patent: Aug. 4, 2026

(54) VEHICLE OCCUPANT RESTRAINT DEVICE

(71) Applicant: TOYOTA JIDOSHA KABUSHIKI KAISHA, Toyota Aichi-ken (JP)

(72) Inventors: Mitsuyoshi Ohno, Miyoshi Aichi-ken (JP); Katsuya Shimazu, Toyota Aichi-ken (JP); Tatsuya Hashido, Nishikasugai-gun Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/081,020

(22) Filed: Mar. 17, 2025

(65) Prior Publication Data

US 2025/0296523 A1 Sep. 25, 2025

(30) Foreign Application Priority Data

Mar. 21, 2024 (JP) ................................. 2024-045749

(51) Int. Cl.
B60R 21/18 (2006.01)

(52) U.S. Cl.
CPC .................................... B60R 21/18 (2013.01)

(58) Field of Classification Search
CPC ................................. B60R 22/26; B60R 21/18
See application file for complete search history.

(56) References Cited

U.S. PATENT DOCUMENTS

| | | | | | |
|---|---|---|---|---|---|
| 5,492,361 | A | * | 2/1996 | Kim | ...................... B60R 21/207 |
| | | | | | 280/730.2 |
| 10,882,489 | B2 | * | 1/2021 | Ohno | .................... B60R 22/023 |
| 2009/0322067 | A1 | * | 12/2009 | Nezaki | .................... B60R 21/18 |
| | | | | | 297/474 |
| 2011/0241406 | A1 | * | 10/2011 | Fukuzawa | ............... B60R 22/26 |
| | | | | | 297/474 |
| 2019/0225185 | A1 | * | 7/2019 | Ohno | .................. B60R 22/1953 |
| 2019/0291685 | A1 | * | 9/2019 | Ohno | .................... B60R 22/023 |
| 2023/0339421 | A1 | * | 10/2023 | Yamamoto | ............ B60R 21/207 |
| 2024/0059239 | A1 | * | 2/2024 | Matsuzaki | ............ B60R 21/217 |

FOREIGN PATENT DOCUMENTS

| | | | | | |
|---|---|---|---|---|---|
| DE | 29613427 | U1 | * | 4/2015 | |
| DE | 102018206091 | A1 | * | 10/2019 | ............ B60R 21/16 |
| EP | 1285824 | A1 | * | 2/2003 | ............ B60R 22/22 |
| JP | 2006-256532 | A | | 9/2006 | |
| JP | 2009166774 | A | * | 7/2009 | |
| JP | 2009179115 | A | * | 8/2009 | |
| JP | 2010058725 | A | * | 3/2010 | |
| JP | 2011-148333 | A | | 8/2011 | |
| JP | 2011-213284 | A | | 10/2011 | |

(Continued)

*Primary Examiner* — Nicole T Verley
(74) *Attorney, Agent, or Firm* — Dinsmore & Shohl LLP

(57) ABSTRACT

A vehicle occupant restraint device includes a seat belt, a belt support airbag, and a belt covering member. The seat belt restrains the occupant seated on a seat cushion of a vehicle seat to the vehicle seat. The belt support airbag is provided in a folded state in a lap belt or a shoulder belt of the seat belt and is inflated and deployed by gas supplied in an event of a frontal collision of a vehicle. The belt covering member covers at least a predetermined region of the lap belt on a belt anchor side and urges the lap belt downward when the seat belt is released.

5 Claims, 8 Drawing Sheets

(56)     References Cited

FOREIGN PATENT DOCUMENTS

| | | | | | |
|---|---|---|---|---|---|
| JP | 2013112035 | A | * | 6/2013 | |
| JP | 2013112221 | A | * | 6/2013 | |
| JP | 5704059 | B2 | * | 4/2015 | |
| JP | 2023-132760 | A | | 9/2023 | |
| JP | 2023-160205 | A | | 11/2023 | |
| WO | WO-2008062641 | A1 | * | 5/2008 | ............ B60R 22/03 |

* cited by examiner

VEHICLE OCCUPANT RESTRAINT DEVICE

CROSS-REFERENCE TO RELATED APPLICATION

This application claims priority to Japanese Patent Application No. 2024-045749 filed on Mar. 21, 2024. The disclosure of the above-identified application, including the specification, drawings, and claims, is incorporated by reference herein in its entirety.

BACKGROUND

1. Technical Field

The present disclosure relates to a vehicle occupant restraint device.

2. Description of Related Art

An occupant protection device in which an airbag is assembled into a lap belt portion of a seat belt of a seat belt device with a vehicle seat is known. In the occupant protection device, when the seat belt is released, the seat belt cannot return to an initial position smoothly and quickly due to a weight of the airbag folded even in a case where the seat belt is intended to be returned to the initial position (retracted) by a spring force of a refractor. Therefore, the following measures have been proposed.

An interference suppression portion (recessed portion) that suppresses an interference with a shoulder belt portion during belt extension and belt retraction is formed solely in a region in the vicinity of a lower side of a belt extension port provided at a shoulder area of a seat back (refer to Japanese Unexamined Patent Application Publication No. 2023-132760 (JP 2023-132760 A)). A belt extension port provided at a shoulder area of a seat back is configured to have an opening direction to be rotatable from a forward direction, in which a seat belt can be extended forward, to an oblique direction, in which a tongue of the seat belt can be fastened to a buckle (refer to Japanese Unexamined Patent Application Publication No. 2023-160205 (JP 2023-160205 A)).

However, in a case where a mass of an airbag assembled to the seat belt is large, when the seat belt is released, simply suppressing the interference between the shoulder belt portion and the vicinity of the belt extension port or configuring the belt extension port to have a rotatable opening direction may not be sufficient to smoothly and quickly return the seat belt to an initial position due to a weight of the airbag. Additionally, there is a possibility that the released seat belt protrudes outward in a vehicle width direction and becomes caught in a side door when getting in and out of a vehicle. It is also conceivable to use a retractor with a motor, but a significant increase in cost is incurred.

SUMMARY

The present disclosure provides a vehicle occupant restraint device capable of improving storability when a seat belt provided with a belt support airbag is released.

A first aspect of the present disclosure relates to a vehicle occupant restraint device including a seat belt, a belt support airbag, and a belt covering member. The seat belt is configured to restrain an occupant seated on a seat cushion of a vehicle seat to the vehicle seat. The belt support airbag is provided in a folded state in a lap belt or a shoulder belt of the seat belt and is configured to be inflated and deployed by gas supplied in an event of a frontal collision of a vehicle. The belt covering member is configured to cover at least a predetermined region of the lap belt on a belt anchor side and to urge the lap belt downward when the seat belt is released.

When the seat belt is released, at least the lap belt is stored to a side of the seat cushion due to a weight of the belt covering member. That is, the seat belt that is not retracted by a spring force of a retractor due to a weight of the folded belt support airbag is stored to the side of the seat cushion. As described above, storability when the seat belt provided with the belt support airbag is released is improved. The phrase "in an event of a frontal collision" of the vehicle mentioned here includes a time when a frontal collision of the vehicle is predicted (forecasted) to be unavoidable.

The belt covering member may be a resin plate having a substantially "C"-shaped cross section and extending along the seat belt.

Even with such a simple configuration, when the seat belt is released, at least the lap belt is smoothly stored to the side of the seat cushion due to the weight of the belt covering member.

The belt covering member may be easily bent inward in a vehicle width direction and may be difficult to be bent outward in the vehicle width direction.

When the seat belt is fastened, the belt covering member fits an abdomen of the occupant, and thus can suppress a decrease in waist restraint performance. Furthermore, when the seat belt is released, at least the lap belt is suppressed or prevented from protruding outward in the vehicle width direction and getting caught in a side door.

The belt covering member may be configured to urge the lap belt downward by a shaft portion spring member provided on a shaft portion of a belt anchor for the seat belt.

When the seat belt is released, since a spring force of the shaft portion spring member is applied to the weight of the belt covering member, at least the lap belt is quickly stored to the side of the seat cushion.

The belt covering member may include a lower half portion on the belt anchor side and an upper half portion on a side opposite to the belt anchor side. The lower half portion and the upper half portion may be rotatably connected by a support shaft.

When at least the lap belt is stored to the side of the seat cushion, the upper half portion can be rotated toward the lower half portion, and the seat belt in the stored state can be disposed closer to a side of the seat back. Therefore, the seat belt is less likely to become an obstacle when the occupant gets in and out of the vehicle seat.

The upper half portion may be urged to rotate toward the lower half portion by a support shaft spring member provided on the support shaft.

When at least the lap belt is stored to the side of the seat cushion, the upper half portion can be quickly rotated toward the lower half portion, and the seat belt in the stored state can be quickly disposed closer to the side of the seat back.

The vehicle seat may include a fixed armrest.

The occupant can get in and out of the vehicle seat solely from a seat front side. Therefore, even when the belt covering member does not have a configuration in which the belt covering member is divided into the lower half portion and the upper half portion, which are rotatably connected, the seat belt is less likely to become an obstacle when the occupant gets in and out of the vehicle seat.

As described above, according to the present disclosure, it is possible to improve storability when the seat belt provided with the belt support airbag is released.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. For convenience of description, regarding arrows appropriately shown in each of the drawings, an arrow UP indicates an upward direction of a vehicle and a vehicle seat, an arrow FR indicates a forward direction of the vehicle and the vehicle seat, and an arrow RH indicates a rightward direction of the vehicle and the vehicle seat. Therefore, in the following description, in a case where up-down, front-rear, and right-left directions are described without particular mention, up-down, front-rear, and right-left directions in the vehicle and the vehicle seat are represented. In addition, the right-left direction is the same as a vehicle width direction and a seat width direction.

Figure 1:
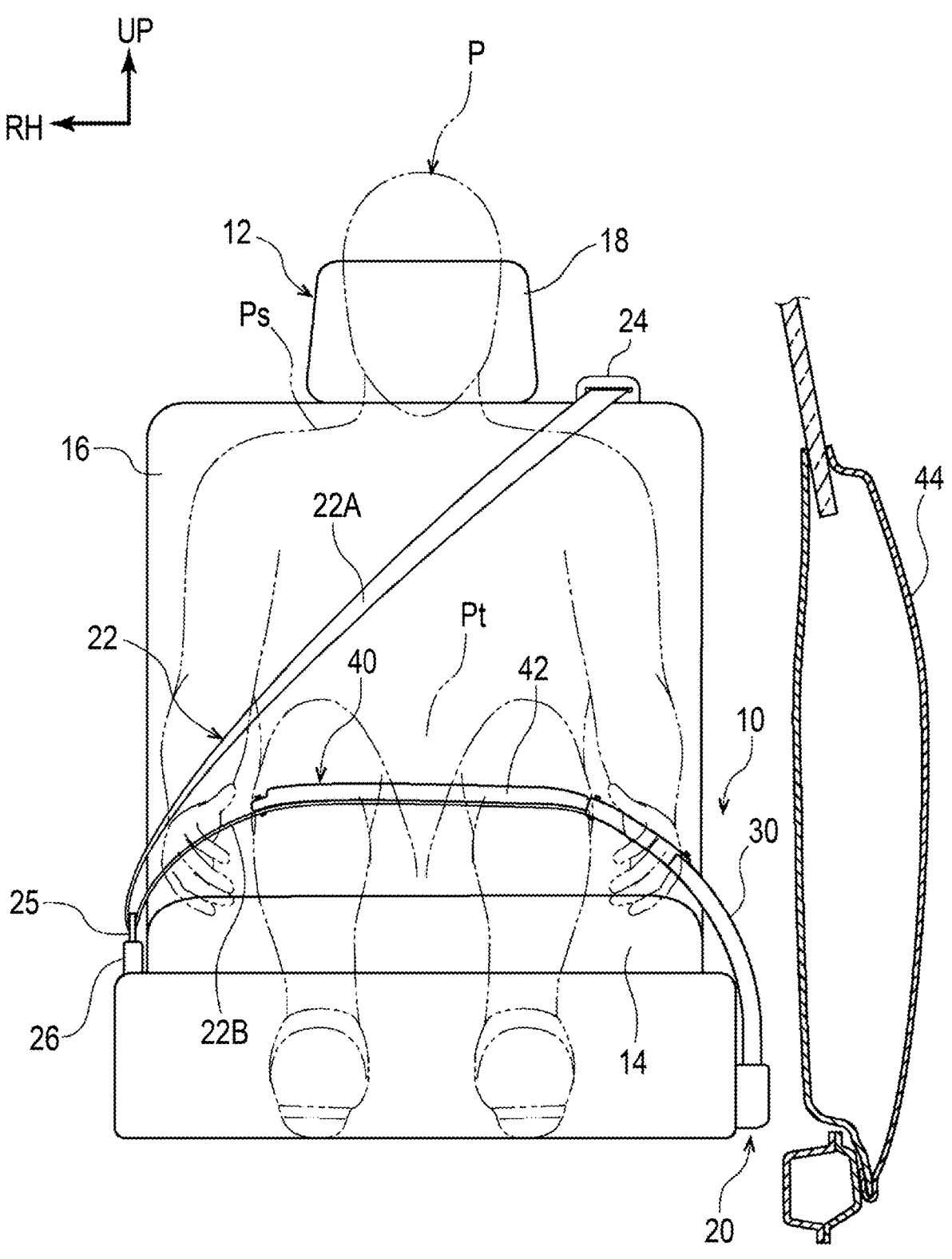
FIG. 1 is a schematic front view showing a seat belt fastened state of a vehicle occupant restraint device according to the present embodiment.
Figure 6:
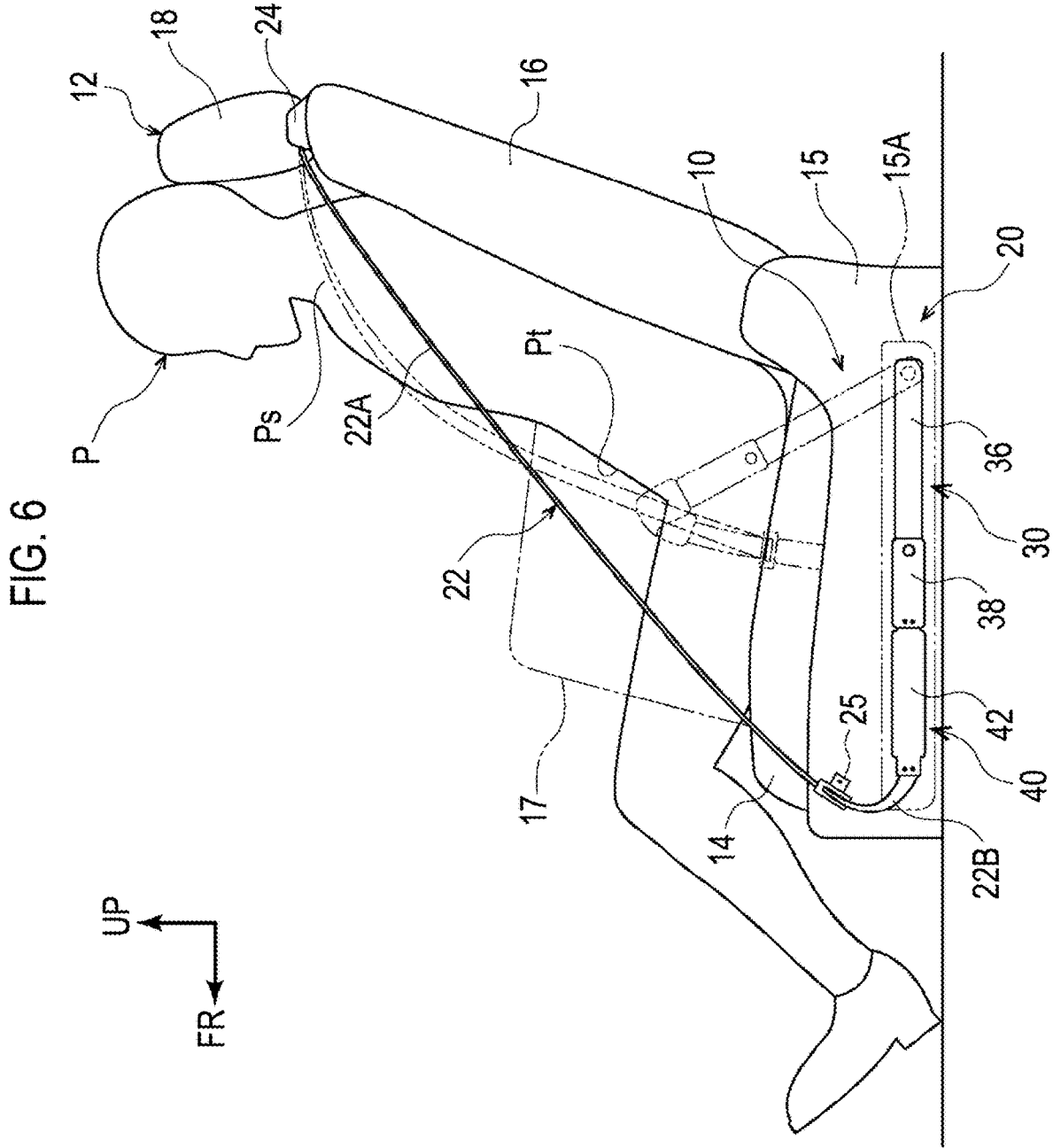
FIG. 6 is a schematic side view showing a seat belt stored state in a case where the vehicle occupant restraint device according to the present embodiment is mounted on a vehicle seat having a fixed armrest.

As shown in FIG. 1, a vehicle occupant restraint device 10 according to the present embodiment is provided on a vehicle seat 12. The vehicle seat 12 is a front seat or a rear seat of a vehicle (automobile), and includes a seat cushion 14, a seat back 16 that is provided to be rotatable about a seat width direction as an axial direction at a rear end portion of the seat cushion 14, and a headrest 18 that is provided to be movable up and down at an upper end portion of the seat back 16. As shown in FIG. 6, there are cases where the vehicle seat 12 is provided with a fixed armrest 17.

In FIG. 1 and the like, a collision test dummy (human body dummy) is shown seated on the seat cushion 14 of the vehicle seat 12 as a model of an occupant (seated person) to be protected. The dummy is, for example, an AM50 (50th percentile of US adult male) dummy (Hybrid III) for frontal collision tests. The dummy is seated in a standard sitting posture determined by a collision test method. The vehicle seat 12 is positioned at a reference set position corresponding to the sitting posture. The dummy is hereinafter referred to as an "occupant P".

As shown in FIG. 1, the occupant P seated on the seat cushion 14 of the vehicle seat 12 is restrained to the vehicle seat 12 by a seat belt (webbing) 22 provided in a seat belt device 20. The seat belt device 20 is a three-point seat belt device, and is a so-called seat-integrated seat belt device. In addition, in the following description, a part of the seat belt 22 that is stretched from a shoulder Ps to an abdomen Pt of the occupant P is referred to as a shoulder belt 22A. A part of the seat belt 22 that is stretched from right to left on the abdomen Pt of the occupant P is referred to as a lap belt 22B.

Figure 2:
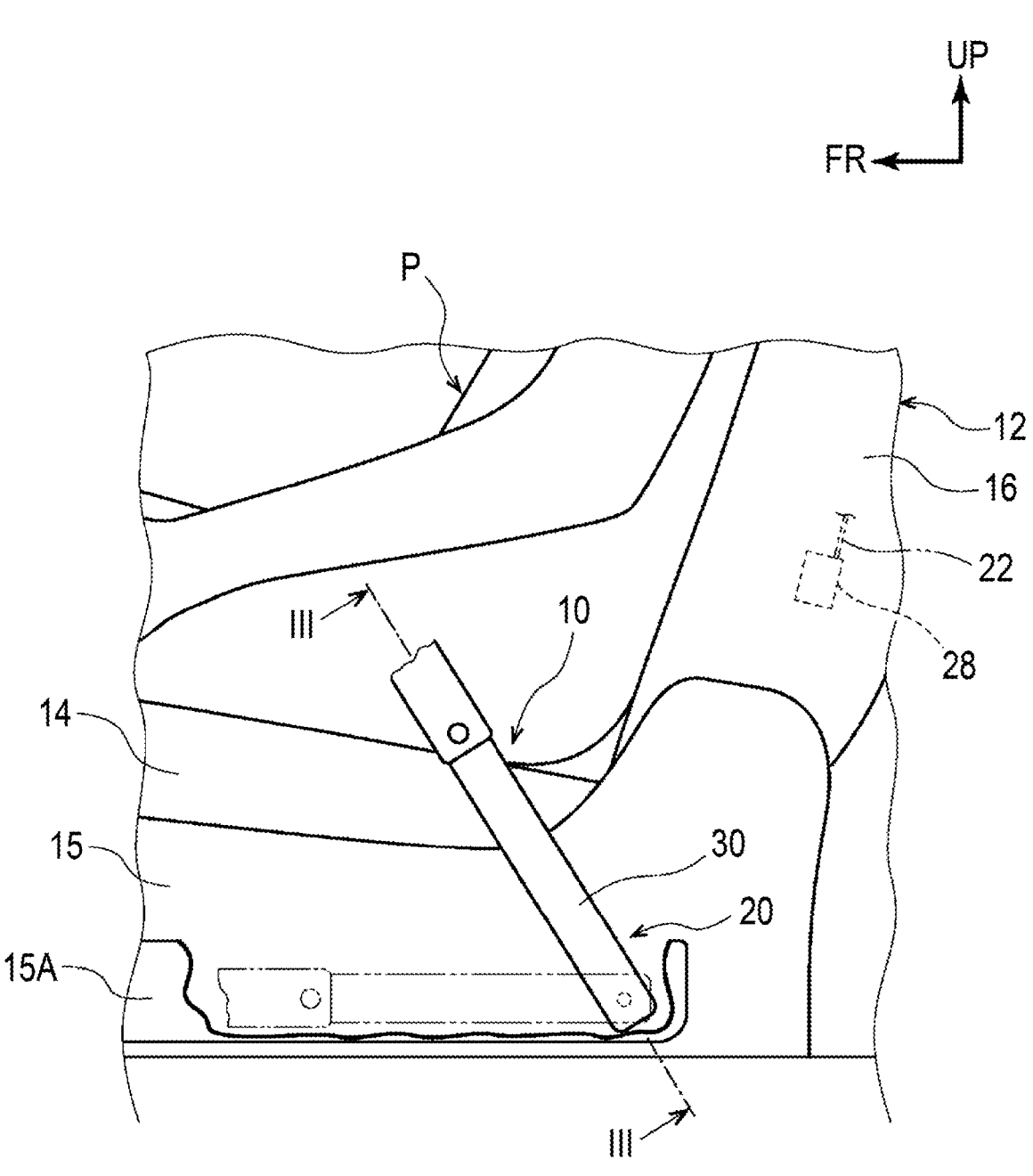
FIG. 2 is a schematic side view showing a part of a belt covering member of the vehicle occupant restraint device according to the present embodiment.

A bezel 24 that serves as an outlet of the seat belt 22 is provided on an outer side in the vehicle width direction (first end portion side in the seat width direction) at an upper end surface of the seat back 16. A buckle 26 for securing a tongue 25 provided on the seat belt 22 is provided on an inner side in the vehicle width direction (second end portion side in the seat width direction) of the seat cushion 14. As shown in FIG. 2, a retractor 28 for winding a first end portion side of the seat belt 22 is attached to a lower portion of a side frame (not shown) provided on the outer side in the vehicle width direction inside the seat back 16.

Figure 3:
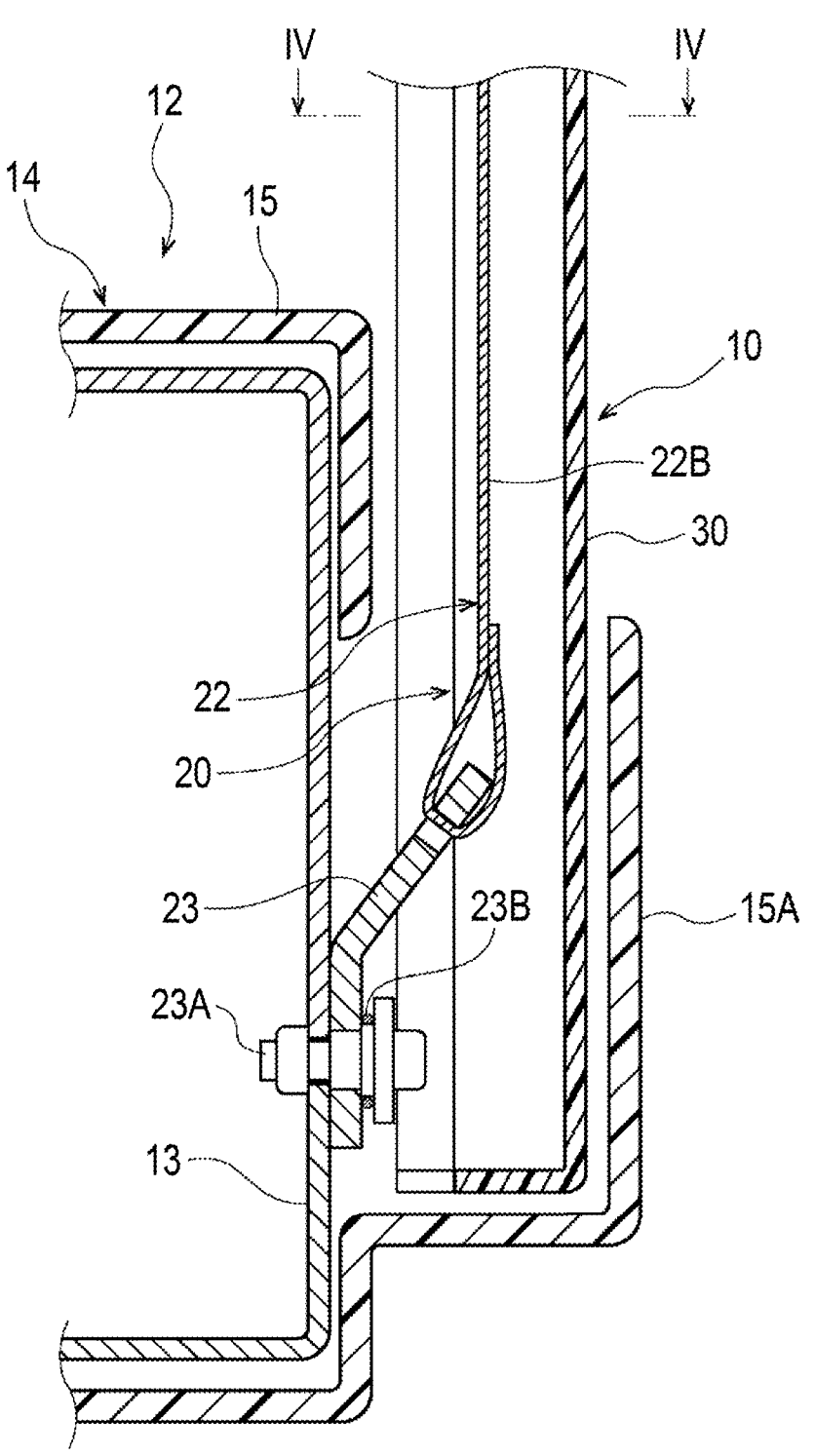
FIG. 3 is a schematic enlarged cross-sectional view taken along line III-III of FIG. 2.

As shown in FIG. 3, a second end portion of the seat belt 22 is attached to a substantially rectangular flat plate-shaped belt anchor 23. Specifically, the second end portion of the seat belt 22 is inserted into a slit portion (not shown) formed in a first end portion of the belt anchor 23 and is folded back. The folded-back portion is sewn to the seat belt 22. A second end portion of the belt anchor 23 is attached to a side frame 13 provided inside the seat cushion 14 on the outer side in the vehicle width direction, so as to be rotatable around a shaft portion 23A with the seat width direction as an axial direction.

Additionally, the shaft portion 23A is provided with a torsion spring 23B as a shaft portion spring member that urges a first end portion side of the belt anchor 23 to rotate downward. As a result, when the seat belt 22 is released, a belt covering member 30, which will be described later, urges the lap belt 22B downward by a spring force of the torsion spring 23B in addition to a weight of the belt covering member 30. The spring force of the torsion spring 23B is set to be weak enough to assist in rotation of the belt covering member 30 due to the weight of the belt covering member 30 such that the spring force does not become a resistance when the seat belt 22 is fastened.

Figure 4:
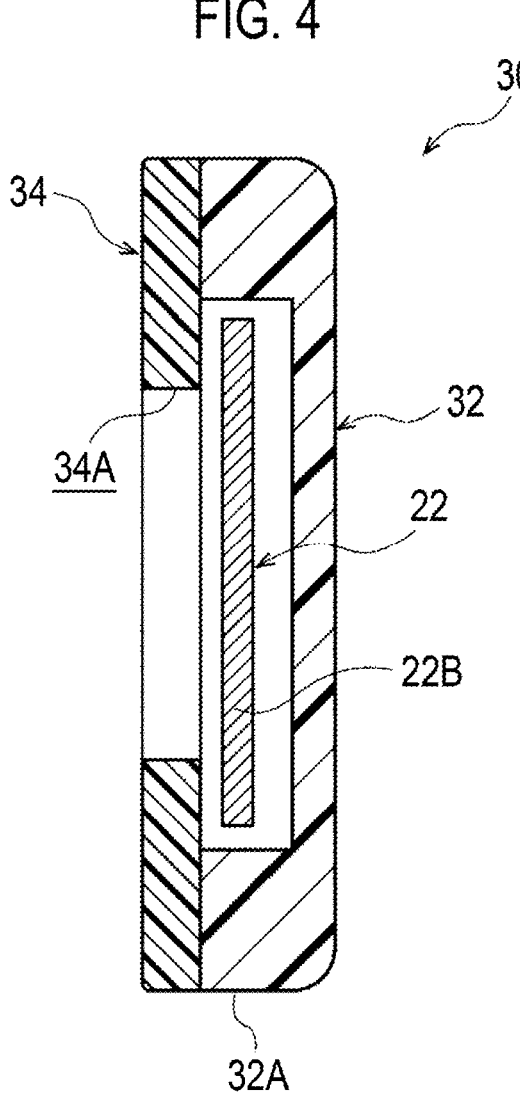
FIG. 4 is a schematic cross-sectional view taken along line IV-IV of FIG. 3.

As shown in FIGS. 1 to 3, a predetermined region of the lap belt 22B on a belt anchor 23 side relative to a belt support airbag 42, which will be described later, is covered with the belt covering member 30. The belt covering member 30 is made of a resin plate that extends along the seat belt 22 (lap belt 22B). As shown in FIG. 4, a flat plate-shaped inner plate 34 that constitutes an inner part in the vehicle width direction is joined to a side wall 32A, which is an open side of an outer plate 32 that has a substantially "U"-shaped cross section and constitutes an outer part in the vehicle width direction, by fitting, welding, or the like in a thickness direction to form a substantially "C"-shaped cross section.

That is, a slit portion 34A extending along an extension direction of the seat belt 22 is formed in a center portion of the inner plate 34. The belt covering member 30 is attached to a predetermined region of the lap belt 22B by relatively inserting the lap belt 22B into the slit portion 34A. When the seat belt 22 is released, the lap belt 22B is urged downward together with the belt covering member 30 by the weight of the belt covering member 30 and also by the spring force of the torsion spring 23B provided on the shaft portion 23A.

As shown in FIGS. 2 and 3, a seat side shield 15 made of resin is provided in a side portion of the seat cushion 14 on the outer side in the vehicle width direction. Then, a storage pocket portion 15A that can store the lap belt 22B and the belt covering member 30 that are urged downward is formed at a lower portion of the seat side shield 15 on the outer side in the vehicle width direction.

Furthermore, the belt covering member 30 is configured to be easily bent inward in the vehicle width direction and to be difficult to be bent outward in the vehicle width direction. Specifically, the outer plate 32 is formed of a soft resin material that is easily elastically deformed. The inner plate 34 is formed of a hard resin material that is difficult to be elastically deformed. For example, the outer plate 32 is made of a resin in which a rubber component is uniformly mixed with polypropylene (PP). The inner plate 34 is made of a resin such as polypropylene (PP), polycarbonate (PC), or acrylonitrile butadiene styrene (ABS).

The belt covering member 30 may be configured to be easily bent inward in the vehicle width direction and difficult to be bent outward in the vehicle width direction by different shapes instead of different materials. For example, the belt covering member 30 may be configured to be easily bent inward in the vehicle width direction and to be difficult to be bent outward in the vehicle width direction by forming a plurality of cutout portions (not shown) at predetermined portions of the outer plate 32 to be arranged at a predetermined interval in the extension direction of the seat belt 22. Different shapes enable easier and cheaper manufacturing than different materials.

Figures 5A, 5B:
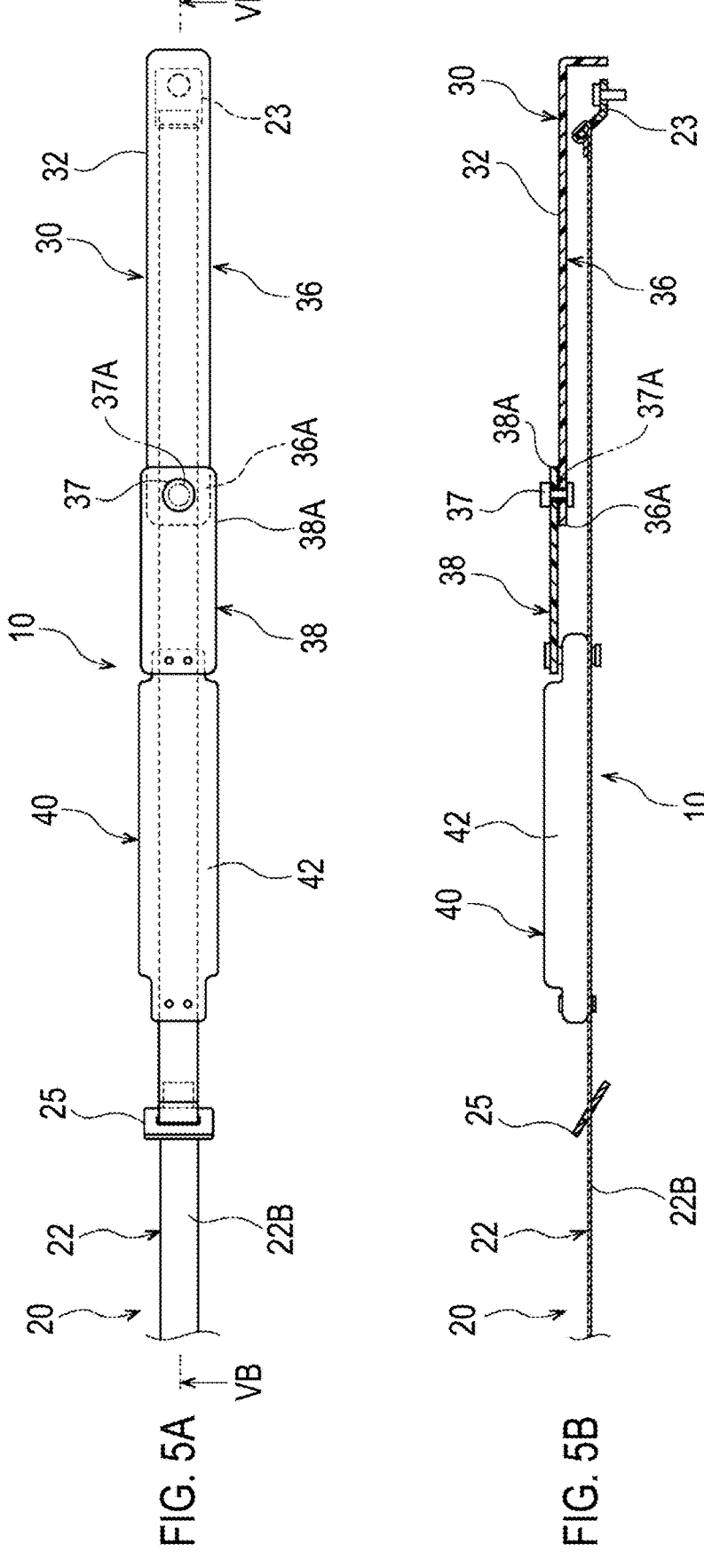
FIG. 5A is a schematic plan view showing the belt covering member of the vehicle occupant restraint device according to the present embodiment.
FIG. 5B is a schematic cross-sectional view taken along line VB-VB of FIG. 5A.

As shown in FIGS. 5A and 5B, the belt covering member 30 includes a lower half portion 36 on the belt anchor 23 side and an upper half portion 38 on a side opposite to the belt anchor 23 side. The lower half portion 36 and the upper half portion 38 are rotatably connected by a support shaft 37. Therefore, the inner plate 34 is not provided in an end portion 36A of the lower half portion 36 and an end portion 38A of the upper half portion 38 that are connected by the support shaft 37. The outer plate 32 at each of the end portions 36A, 38A does not have the side wall 32A (see FIG. 4) to which the inner plate 34 is attached. That is, the outer plate 32 at each of the end portions 36A, 38A is simply formed in a flat plate shape.

Additionally, the support shaft 37 is provided with a torsion spring 37A (see FIGS. 5A and 5B) as a support shaft spring member. As a result, in the belt covering member 30 stored in the lower portion (the storage pocket portion 15A) of the seat side shield 15 on the outer side in the vehicle width direction, the upper half portion 38 is urged to rotate from an upper side toward the lower half portion 36 (in a clockwise direction in a side view shown in FIG. 7). The spring force of the torsion spring 37A is also set to be weak enough to assist in manually rotating the upper half portion 38 such that the spring force does not become a resistance when the seat belt 22 is fastened.

As shown in FIGS. 1, 5A, and 5B, the vehicle seat 12 is provided with an airbag device 40. The airbag device 40 includes an inflator (not shown) embedded in the seat cushion 14 or the seat back 16, and the belt support airbag 42 which is assembled to a surface side (a side opposite to an occupant P side) of a substantially center portion of the lap belt 22B in the seat width direction in a folded state in a normal situation. Therefore, the belt covering member 30 is provided on the belt anchor 23 side relative to the belt support airbag 42.

The inflator is, for example, a gas-sealed (cold type) cylindrical inflator having a substantially cylindrical shape, and is attached to, for example, the side frame 13 of the seat cushion 14 on the outer side in the vehicle width direction or the side frame of the seat back 16 on the outer side in the vehicle width direction. The inflator is connected in communication with the belt support airbag 42 via a flexible tube (not shown) or the like.

The inflator generates gas by being activated by a control device (not shown) provided in the vehicle when a frontal collision of the vehicle is detected or a frontal collision is predicted (forecasted) to be unavoidable (hereinafter referred to as "in an event of a frontal collision of the vehicle") by a collision sensor (not shown) including a camera or the like.

That is, the control device is electrically connected to the inflator and the collision sensor, and is configured to activate the inflator based on information from the collision sensor in an event of a frontal collision of the vehicle. A form of the frontal collision of the vehicle in which the control device activates the inflator includes an offset frontal collision, such as an oblique collision or a small overlap collision, in addition to a full overlap frontal collision.

The gas generated from the inflator is supplied to an inside of the belt support airbag 42. As a result, the belt support airbag 42 inflates and deploys forward to restrain and protect the occupant P, who tends to move forward due to an inertial force. The belt support airbag 42 is formed in a bag shape by, for example, overlapping two sheets of base fabric and sewing peripheral edge portions of the two sheets together. Each sheet of base fabric is formed of, for example, a polyamide-based or polyester-based fabric material.

In the vehicle occupant restraint device 10 according to the present embodiment having the configuration, an operation thereof will be described below.

As shown in FIG. 6, the belt support airbag 42 that inflates and deploys by being supplied with gas in an event of a frontal collision of the vehicle is provided on the surface side of the lap belt 22B in a folded state. Then, the belt covering member 30 that covers the predetermined region of the lap belt 22B on the belt anchor 23 side relative to the belt support airbag 42 urges the lap belt 22B downward by the weight of the belt covering member 30 and also by the spring force of the torsion spring 23B provided on the shaft portion 23A when the seat belt 22 is released.

As a result, the lap belt 22B and the belt covering member 30 are stored in the lower portion of the seat side shield 15 on the outer side in the vehicle width direction, specifically, in the storage pocket portion 15A formed in the seat side shield 15. That is, the seat belt 22 that is not retracted by a spring force of the retractor 28 due to a weight of the folded belt support airbag 42 is stored to a side of the seat cushion 14.

As described above, according to the present embodiment, it is possible to improve storability when the seat belt 22 provided with the belt support airbag 42 is released. As shown in FIG. 6, in some embodiments, the lap belt 22B and the belt covering member 30 are stored in the storage pocket portion 15A. Accordingly, the lap belt 22B and the belt covering member 30 are prevented from protruding outward in the vehicle width direction, and appearance of the vehicle seat 12 is suppressed from being impaired.

The belt covering member 30 includes the lower half portion 36 on the belt anchor 23 side and the upper half portion 38 on the side opposite to the belt anchor 23 side, which are rotatably connected by the support shaft 37. Therefore, in some embodiments, it is also desirable from the viewpoint of appearance, which will be described later, that the upper half portion 38 is rotated toward the lower half portion 36 when the belt covering member 30 is stored in the storage pocket portion 15A. As shown in FIG. 6, in the case of the vehicle seat 12 in which the fixed armrest 17 is provided on right and left side portions, the upper half portion 38 may not be rotated toward the lower half portion 36.

Specifically, in a case where the upper half portion 38 is not rotated toward the lower half portion 36 when the seat belt 22 is released, as shown in FIG. 6, the shoulder belt 22A of the seat belt 22 is stretched in a straight line between a front end portion of the seat side shield 15 and the bezel 24. That is, the shoulder belt 22A of the seat belt 22 is disposed obliquely in a side view in front of the seat back 16.

Here, in a case where the fixed armrest 17 is provided on the right and left side portions as in the vehicle seat 12 shown in FIG. 6, the occupant P can get in and out of the vehicle seat 12 solely from a front side. Therefore, even in a case where the shoulder belt 22A of the seat belt 22 is disposed obliquely in a side view in front of the seat back 16, the shoulder belt 22A is less likely to be an obstacle when the occupant P gets in and out of the vehicle seat 12. Therefore, in the case of the vehicle seat 12 in which the fixed armrest 17 is provided on the right and left side portions, the upper half portion 38 may not be rotated toward the lower half portion 36.

Furthermore, the belt covering member 30 is formed of a resin plate having a substantially "C"-shaped cross section and extending along the seat belt 22. Therefore, a significant cost increase is not incurred. Even with such a simple configuration, when the seat belt 22 is released, the lap belt 22B and the belt covering member 30 can be smoothly and quickly stored in the storage pocket portion 15A by the weight of the belt covering member 30 and also by the spring force of the torsion spring 23B provided on the shaft portion 23A.

Additionally, the belt covering member 30 is configured to be easily bent inward in the vehicle width direction and to be difficult to be bent outward in the vehicle width direction. Therefore, as shown in FIG. 1, when the seat belt 22 is fastened, the belt covering member 30 fits the abdomen of the occupant P, and thus can suppress a decrease in waist restraint performance. Furthermore, when the seat belt 22 is released, the lap belt 22B and the belt covering member 30 can be suppressed or prevented from protruding outward in the vehicle width direction, and the lap belt 22B and the belt covering member 30 can be suppressed or prevented from getting caught in a side door 44 or from not fitting into the storage pocket portion 15A.

Figure 7:
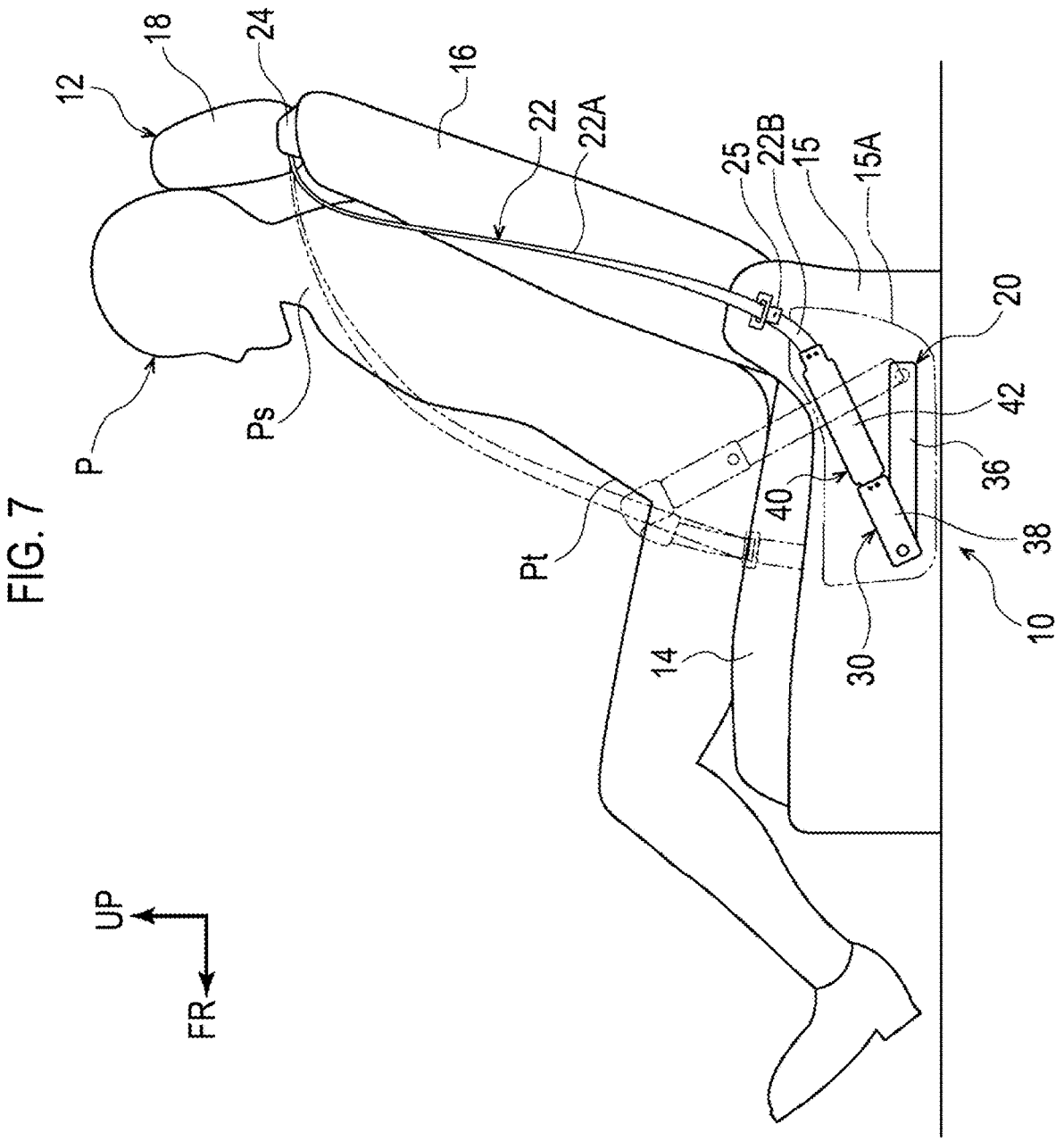
FIG. 7 is a schematic side view showing a seat belt stored state in a case where the vehicle occupant restraint device according to the present embodiment is mounted on a vehicle seat without an armrest.

Furthermore, as described above, the belt covering member 30 includes the lower half portion 36 on the belt anchor 23 side and the upper half portion 38 on the side opposite to the belt anchor 23 side, which are rotatably connected by the support shaft 37. Therefore, as shown in FIG. 7, when the lap belt 22B and the belt covering member 30 are stored in the storage pocket portion 15A, the upper half portion 38 can be rotated toward the lower half portion 36 such that the shoulder belt 22A in the seat belt 22 in the stored state is disposed closer to a side of the seat back 16 (rearward of the state shown in FIG. 6).

In other words, when the seat belt 22 is released, the shoulder belt 22A of the seat belt 22 is prevented from being disposed obliquely in a side view in front of the seat back 16. Therefore, even in a case where the fixed armrest 17 is not provided as in the vehicle seat 12 shown in FIG. 7, and the occupant P gets in and out of the vehicle seat 12 from a side door 44 side (left side in the drawing), the shoulder belt 22A of the seat belt 22 is less likely to be an obstacle. Accordingly, the shoulder belt 22A of the seat belt 22 is avoided from being disposed obliquely in a side view in front of the seat back 16, appearance of a vehicle cabin is not impaired.

When the upper half portion 38 is urged to rotate toward the lower half portion 36 by the torsion spring 37A provided on the support shaft 37, the upper half portion 38 can be quickly rotated toward the lower half portion 36. That is, the shoulder belt 22A of the seat belt 22 in the stored state can be quickly disposed closer to the side of the seat back 16.

As shown in FIG. 1, the seat belt 22 is fastened during traveling of the vehicle. Here, in an event of a frontal collision of the vehicle, the inflator is activated by the control of the control device. That is, the gas is ejected from the inflator, and the gas is supplied to the inside of the folded belt support airbag 42 disposed on the surface side of the lap belt 22B. As a result, the belt support airbag 42 inflates and deploys forward such that the belt support airbag 42 can restrain and protect the occupant P, who tends to move forward due to the inertial force caused by an impact in the event of the frontal collision of the vehicle.

Although the vehicle occupant restraint device 10 according to the present embodiment has been described based on the drawings, the vehicle occupant restraint device 10 according to the present embodiment is not limited to the illustrated example, and can be appropriately modified in design within the scope that does not depart from the gist of the present disclosure. For example, the storage pocket portion 15A may not be formed in the seat side shield 15.

Figure 8:
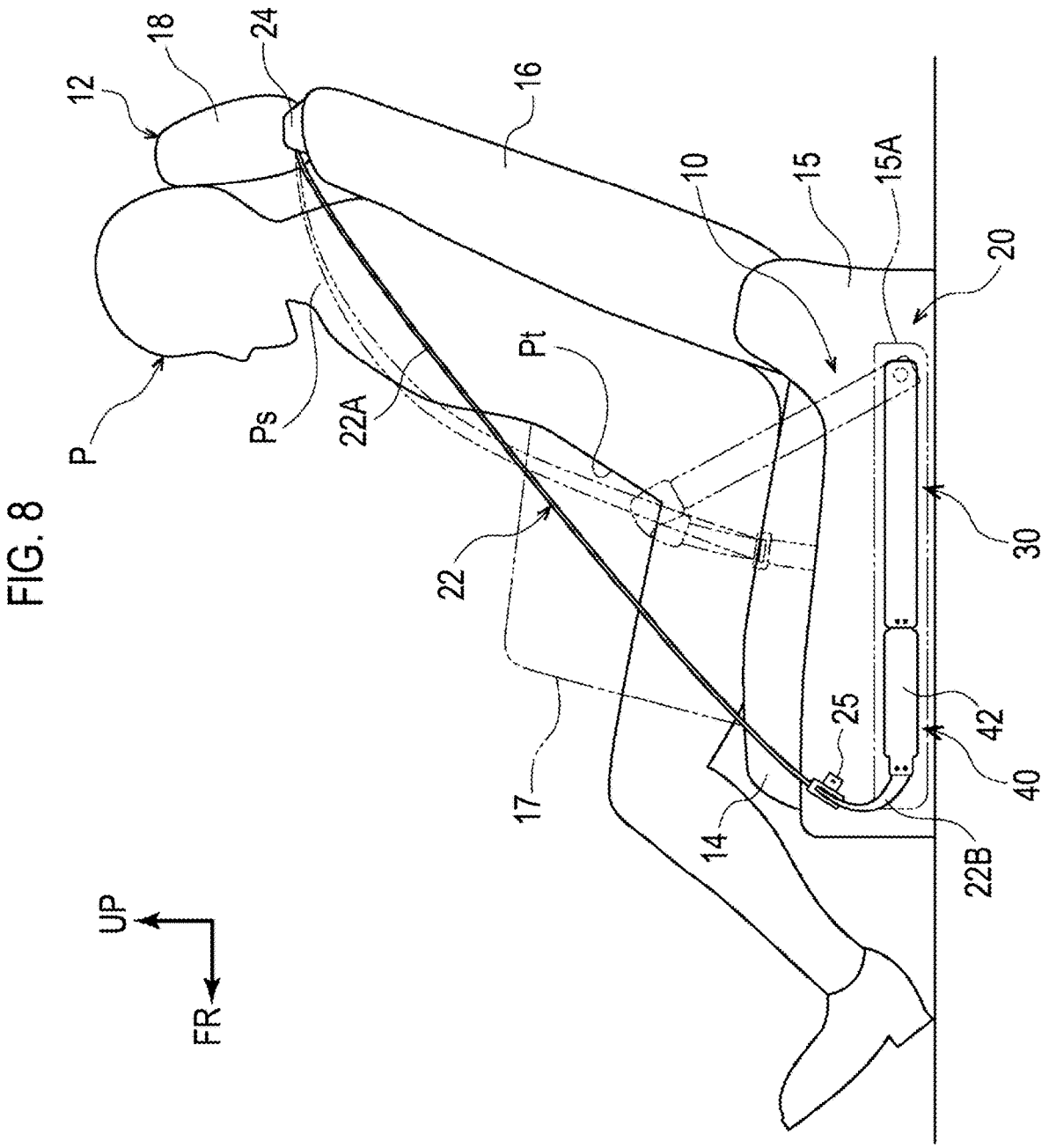
FIG. 8 is a schematic side view showing a seat belt stored state in a case where a vehicle occupant restraint device according to a modification example of the present embodiment is mounted on the vehicle seat having the fixed armrest.

The belt covering member 30 may not have a configuration in which the belt covering member 30 is divided into the lower half portion 36 and the upper half portion 38, which are rotatably connected. That is, the belt covering member 30 may be configured as a single elongated member as shown in FIG. 8. In a case where the belt covering member 30 is configured as described above, a manufacturing cost can be reduced compared to a configuration in which the belt covering member 30 is divided into the lower half portion 36 and the upper half portion 38, which are rotatably connected.

However, in a case where the belt covering member 30 is configured as described above, as shown in the figure, the shoulder belt 22A of the seat belt 22 is disposed obliquely in a side view in front of the seat back 16 when the seat belt 22 is released. Therefore, in some embodiments, the configuration is applied solely to the vehicle seat 12 having the fixed armrest 17 in which the shoulder belt 22A is less likely to be an obstacle when the occupant P gets in and out of the vehicle seat 12.

The seat belt device 20 (retractor 28) may be provided in a center pillar (not shown) as a vehicle body. The belt covering member 30 is not limited to having a substantially "C"-shaped cross section, and may be formed, for example, in a rectangular tube shape through which the seat belt 22 (lap belt 22B) is inserted. Moreover, the shaft portion 23A may not be provided with the torsion spring 23B. The support shaft 37 may not be provided with the torsion spring 37A.

In addition, the belt support airbag 42 may be assembled to the shoulder belt 22A instead of the lap belt 22B. In this case, in some embodiments, since the shoulder belt 22A provided with the belt support airbag 42 through the lap belt 22B is urged downward, it is desirable to increase the spring force of the torsion spring 23B of the belt covering member 30. In this case, in some embodiments, the belt covering member 30 has a configuration in which the belt covering member 30 is divided into the lower half portion 36 and the upper half portion 38, which are rotatable around the support shaft 37.

What is claimed is:

1. A vehicle occupant restraint device comprising:
a seat belt configured to restrain an occupant seated on a seat cushion of a vehicle seat to the vehicle seat;
a belt support airbag provided in a folded state in a lap belt or a shoulder belt of the seat belt and configured to be inflated and deployed by gas supplied in an event of a frontal collision of a vehicle; and
a belt covering member configured to cover at least a predetermined region of the lap belt on a belt anchor side and to urge the lap belt downward when the seat belt is released, wherein the belt covering member is a resin plate having a substantially "C"-shaped cross section and extending along the seat belt;
wherein the belt covering member includes a lower half portion on the belt anchor side and an upper half portion on a side opposite to the belt anchor side; and
wherein the lower half portion and the upper half portion are rotatably connected by a support shaft.

2. The vehicle occupant restraint device according to claim 1, wherein the belt covering member is easily bent inward in a vehicle width direction and is difficult to be bent outward in the vehicle width direction.

3. The vehicle occupant restraint device according to claim 1, wherein the belt covering member is configured to urge the lap belt downward by a shaft portion spring member provided on a shaft portion of a belt anchor for the seat belt.

4. The vehicle occupant restraint device according to claim 1, wherein the upper half portion is urged to rotate toward the lower half portion by a support shaft spring member provided on the support shaft.

5. The vehicle occupant restraint device according to claim 1, wherein the vehicle seat includes a fixed armrest.

* * * * *